(12) United States Patent
Sabiwalsky (10) Patent No.: US 8,473,584 B2
(45) Date of Patent: Jun. 25, 2013

(54) REVOCABLE INDICATION OF SESSION TERMINATION

(75) Inventor: Dirk Sabiwalsky, Sandhausen (DE)

(73) Assignee: SAP AG, Walldorf (DE)

( * ) Notice: Subject to any disclaimer, the term of this patent is extended or adjusted under 35 U.S.C. 154(b) by 217 days.

(21) Appl. No.: 12/973,578

(22) Filed: Dec. 20, 2010

(65) Prior Publication Data

US 2012/0158814 A1 Jun. 21, 2012

(51) Int. Cl.
*G06F 15/173* (2006.01)

(52) U.S. Cl.
USPC ............ 709/218; 709/224; 709/228; 370/9

(58) Field of Classification Search
USPC ................. 709/204, 218, 224; 370/9, 781
See application file for complete search history.

(56) References Cited

U.S. PATENT DOCUMENTS

| | | | | |
|---|---|---|---|---|
| 5,555,407 A * | 9/1996 | Cloutier et al. | | 1/1 |
| 5,809,299 A * | 9/1998 | Cloutier et al. | | 705/27.1 |
| 7,949,677 B2 * | 5/2011 | Croft et al. | | 707/781 |
| 8,140,980 B2 * | 3/2012 | Gunasekar et al. | | 715/753 |
| 2005/0147084 A1 * | 7/2005 | Zhang et al. | | 370/352 |
| 2007/0171921 A1 * | 7/2007 | Wookey et al. | | 370/401 |
| 2007/0179955 A1 * | 8/2007 | Croft et al. | | 707/9 |
| 2007/0180450 A1 * | 8/2007 | Croft et al. | | 718/1 |
| 2007/0198656 A1 * | 8/2007 | Mazzaferri et al. | | 709/218 |
| 2012/0117153 A1 * | 5/2012 | Gunasekar et al. | | 709/204 |

* cited by examiner

*Primary Examiner* — Khanh Dinh

(74) *Attorney, Agent, or Firm* — Brake Hughes Bellermann LLP

(57) ABSTRACT

According to one general aspect, a method for a computing device may include establishing, via a first application executed by the computing device, a data session with a server. The server may maintain a set of session data associated with the data session. The method may also include processing a request to terminate the active functioning of the first application. The method may further include transmitting a session-inactivation message to the server, wherein the session-inactivation message instructs the server to maintain the set of session data.

22 Claims, 8 Drawing Sheets

REVOCABLE INDICATION OF SESSION TERMINATION

TECHNICAL FIELD

This description relates to managing information, and more specifically to the maintenance of information used within a client-server relationship.

BACKGROUND

In the area of client/server computing, often client-related data is stored on a server. The client/server interaction is typically referred to as a "session" or "data session". The data created, modified, or associated with this session is often referred to as "session data". A server may measure the amount of activity with a client. The session and the session data are traditionally associated with a lifetime or period of time in which the session data will be maintained even though no activity occurs from the client. The lifetime of that data is mostly limited for various reasons, for example, security concerns, to reduce the amount of required resources consumed by maintaining the data, etc. After the time of inactivity with the client has exceeded this lifetime period, the client's session is generally terminated and the associated session data are dis-associated (e.g., deleted, etc.) with the session and the client.

Clients may actively terminate a session in case the session and session data is not needed or desired any longer. For example, when a user stops the client software, the client software may transmit a session termination message to the server, causing the session data to no longer be maintained (e.g., deleted, saved permanently and any temporary data storage deleted or un-allocated from memory). When a server services a large number of clients the active termination may reduce the number of sessions and their associated system resource usage (e.g., memory usage due to session data storage, network connection usage, etc.) considerably.

If the client software is started again, a new session is created and a user has to authenticate themselves with the server (e.g. by entering their credentials, passwords, etc.). Also, any subsequent or new session does not have access to the prior session data, as that prior session data was associated with the prior or old session, and was likely deleted as a result of the prior explicit session termination (e.g., session termination message, etc.) or an implicit session termination (e.g., by letting the lifetime period expire, etc.).

SUMMARY

According to one general aspect, a method for a computing device may include establishing, via a first application executed by the computing device, a data session with a server. The server may maintain a set of session data associated with the data session. The method may also include processing a request to terminate the active functioning of the first application. The method may further include transmitting a session-inactivation message to the server, wherein the session-inactivation message instructs the server to maintain the set of session data.

According to another general aspect, a method may include establishing, with a computing device, a data session. The data session may include a set of session data associated, at least indirectly, with the computing device. The method may also include establishing a lifetime period equal to a first lifetime period value, wherein if the lifetime period expires the data session is terminated. The method may include receiving a session-inactivation message from the computing device, wherein the session-inactivation message indicates a second lifetime period value. The method may include setting the lifetime period to the second lifetime period value. The method may further include preventing the termination of the data session until either the expiration of the lifetime period or receipt of a session-termination message.

According to another general aspect, an apparatus may include a network interface configured to send and receive signals between a sever and the apparatus. The apparatus may include a memory configured to store executable code. The apparatus may include a processor configured to execute the executable code. The executable code may be configured to cause the apparatus to: establish, via a first application executed by the apparatus, a data session with the server, wherein the server maintains a set of session data associated with the data session, process a request to terminate the active functioning of the first application, and transmit a session-inactivation message to the server, wherein the session-inactivation message instructs the server to maintain the set of session data.

The details of one or more implementations are set forth in the accompanying drawings and the description below. Other features will be apparent from the description and drawings, and from the claims.

A system and/or method for managing information, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
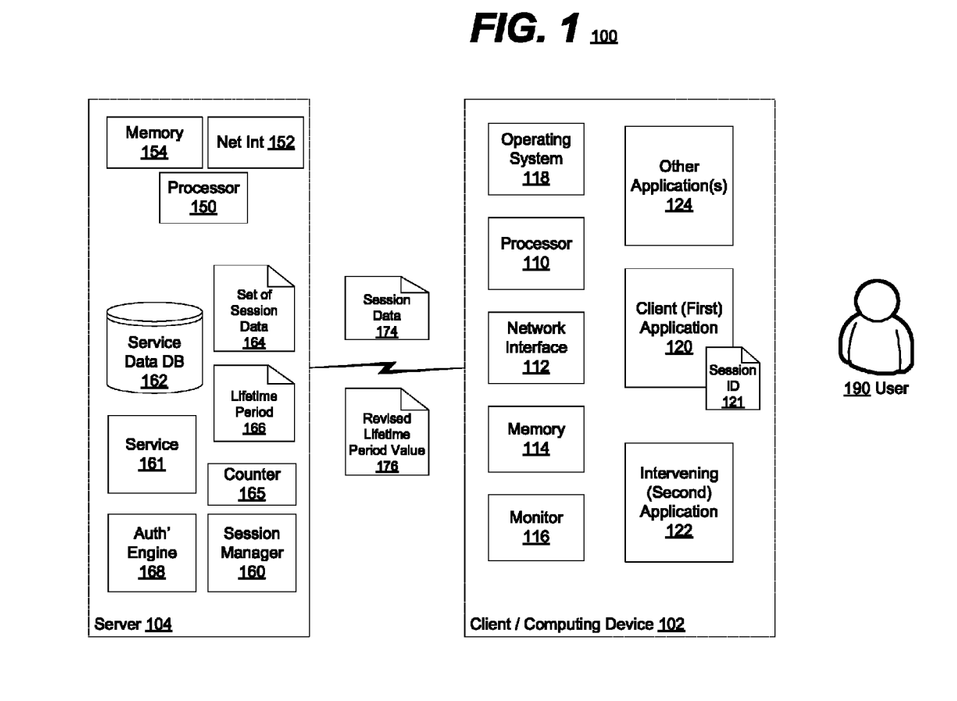
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a client or computing device 102 and a server 104. The client or computing device 102 may be operated or used by a user 190. In such an embodiment, the user 190 may make use of an application 120 which starts or is associated with a data session involving the server 104.

In one embodiment, the computing device 102 may include a processor 110, a network interface 112, a memory 114, and monitor or display (e.g., a desktop monitor, a touchscreen, etc.) 116, and possibly an operating system 118. In various embodiments, the computing device 102 may include, for example, a desktop computer, a laptop, a netbook, a tablet, a smartphone, a handheld device, etc.

Likewise, in various embodiments, the server 104 may include a processor 150, a memory 154, and a network interface 152. In some embodiments, the server 104 may be physically remote from the computing device 102. The server 104 and the computing device 102 may be communication with each other via one or more networks (e.g., a wired network, a wireless network, a cellular data network, a virtual private network, local area network, etc.).

In various embodiments, the server 104 may provide a service 161, such as, for example, Supplier Relationship Management (SRM), Product Lifecycle Management (PLM), Supply Chain Management (SCM), Customer relationship management (CRM), Enterprise resource planning (ERP), etc. It is understood that the above are merely a few illustrative examples to which the disclosed subject matter is not limited.

In such an embodiment, the server 104 may include a session manager 160 configured to manage a session of the provided service (e.g., SRM, PLM, etc.) for a given client (e.g., computing device 102 or the application 102). The service 161 and the session manager 160 may utilize the service data (e.g., customer data, inventory data, employee data, etc.) stored within the service data database (DB) 162). From this service data DB 162 various sets of session data 164 may be created. Each set of session data 164 may be associated with a particular data session and thereof a particular computing device 102 or application 120.

In some embodiments, more than one instance of a client application 120 may be executed by a given computing device 102. In such an embodiment, each client application 120 may be associated with an individual session, and therefore, set of session data 164. In the illustrated embodiment of FIG. 1, a single client application embodiment is shown, but the disclosed subject matter is not so limited.

In various embodiments, the user 190 may execute a client application 120 via the computing device 102. In such an embodiment, the client application 120 may initiate or establish a data session with the server 104 or service 161. As part of establishing the data session, the session manager 160 may assign a session identifier (ID) 121 to the client application 120. This session ID 121 may be employed to identify the client application 120's session from a plurality of other data sessions (not shown) serviced by the server 104.

In some embodiments, the user 190 or the client application 120 may be required to authenticate themselves. In such an embodiment, the server 104 or other device (not shown) may include an authentication engine 168 configured to confirm the genuineness or validity of the user 190 and the user 190's ability, rights, and/or privileges to interact with the server 104 or the service 161. In various embodiments, this may include the use of a username, password, cryptographic value (e.g., pseudo-random token value, etc.), etc. In such an embodiment, the authentication may occur prior to the assignment of a session ID 121 or establishment of the session.

Furthermore, the session manager 160 may be configured to create a set of session data 164 for the client application 120. As the client application 120 interacts with the service 161, the client application 120 may create, modify, delete, or otherwise manipulate the set of session data 164 associated with the client application 120. In such an embodiment, the client applications may perform various session transactions (e.g., an action that creates, modifies, deletes session data, or otherwise interacts with the service 161, etc.) which cause, in some cases, session data 174 (e.g., portions of the set of session data 164, etc.) to be transmitted between the client application 120 and the server 104. In addition, various non-session data (e.g., user interface (UI) data, etc.) may also be transferred between the client application 102 and the server 104. In some embodiments, the session ID 121 may be included in each transmission from the client application to the server 104 to indicate to the service 161 which set of session data 164 is to be manipulated.

In various embodiments, the session manager 160 may associate a lifetime period 166 with each session and therefore each set of session data 164. In such an embodiment, the lifetime period 166 may be measured in minutes, milliseconds, or other units of time (e.g., clock cycles, etc.). The session manager 160 may be configured to monitor the level of activity or inactivity of the sessions, such as, for example, how long ago the last session transaction or other interaction between the client application 120 (associated with the session) and the service 161 or server 104 occurred.

In such an embodiment, the session manager 160 may maintain a counter 165 for each session (e.g., the session with client application 120, etc.) that tracks the amount of time since the last session transaction or interaction occurred. In various embodiments, once this counter 165 is equal to or greater than the lifetime period 166, the session manager 160 may consider the session to have ended or be terminated. It is understood that the above is merely one illustrative example to which the disclosed subject matter is not limited, and that other inactivity measurement means may be employed and/or that the direction (e.g., count up from zero, count down from the lifetime period, etc.) may differ in various embodiments. In another embodiment, the session may be explicitly terminated (e.g., via a session termination message, etc.) by the client application 120.

In one embodiment, when the session manager 160 determines that the session has terminated, the session manager 160 may cease to maintain the associated set of session data 164. In such an embodiment, this may include simply deleting the set of session data 164 and freeing or de-allocating the portion of memory 154 employed to store the session data set 164. In another embodiment, the session manager 160 or service 161 may save any changed (e.g., created, modified, or deleted, etc.) portions of the set of session data 164 to the service data DB 162 for permanent storage, and then delete the set of session data 164 from the memory 154. In addition, the session manager 160 may free up any other system resources (e.g., open network ports, dedicated processor cycles, etc.) consumed by or allocated to the now terminated session. In addition, the session ID 121 may be invalidated and no longer usable, although it is understood that session IDs may be recycled given a recycling scheme which minimizes improper duplication and session data corruption.

The description of the disclosed subject matter now returns to the case in which the client application 120 has established a session, is associated with or assigned a session ID 121 and a set of session data 164, and the session has not been terminated but is ongoing.

In various embodiments, the computing device 102 may include an operating system 118 that does not support multitasking (e.g., running multiple applications substantially simultaneously) or allows only a single application (e.g., application 120 or application 122) to be displayed or interact with a user 190 at a time. In such an embodiment, the application 120 may be placed in the background or an inactive state by the operating system 118 while another application 122 is executed in the foreground. This may be referred to as switching applications (e.g., switching from the first application 120 to a second application 122, etc.). It is understood that the above operating system example is merely one illustrative example to which the disclosed subject matter is not limited.

In such an embodiment, the client application 120 may receive a request to exit or terminate the application 120. For example, the computing device 102 may include a smartphone, and a phone call may be received. The intervening or second application 122 may request that it be given primary focus or placed in the foreground. As such, the client or first application 120 may receive a request to exit, be placed in the background, switched out, or otherwise terminate its active functioning.

In some embodiments, the request to exit or terminate the active functioning of the first or client application 120 may be made by the user 190. For example, the user 190 may be required to explicitly switch to the second or intervening application 122 (e.g., answer the phone call, etc.). In another embodiment, the user 190 may wish to perform another task using the second application 122 or one or more other applications 124 (e.g., browser application, messaging application, calendar application, social networking application, etc.). For example, the user 190 may wish to look something up via a browser application.

In yet another embodiment, the computing device 102 may request that the first or client application 120 be exited or terminated from active functioning due to a change in the power mode of the computing device 102. For example, the computing device 102 may be placed into a suspended power mode (e.g., Sleep, Hibernate, etc.). In such an embodiment, the client application 120 may be paused or suspended.

It is understood that the above are merely a few illustrative examples to which the disclosed subject matter is not limited.

As described above, traditionally, upon exiting or ceasing active execution, the client application 120 may terminate the data session (e.g. via a session termination message, etc.). However, this termination means that when the user 190 returns to or makes active the first or client application 120 (e.g., the phone call ended, etc.) the session, session ID 121, set of session data 164 have all been invalidated or deleted. Furthermore, in some embodiments, the user 190 may need to re-authenticate themselves to the authentication engine 168.

In the illustrated embodiment, once the first or client application 120 receives a request to exit or cease active functioning (e.g., being placed in the background, suspended, etc.), the client application 120 may not explicitly terminate the session, as may have been done traditionally. Instead, the first or client application 120 may transmit a session-inactivation message or a revocable session-termination message to the server 104. Upon receipt of this session-inactivation message, the server 104 or session manager 160 may be notified that the client application 120 may be inactive for a period of time and that the set of session data 164 and the session ID 121 are to be maintained.

In some embodiments, the session manager 160 may re-configure the session and associated entities (e.g., set of session data 164, etc.) to consume less system resources. For example, the set of session data 164 may be moved from being stored in a volatile memory to being stored in a non-volatile memory, the processor 150 may no longer allocate execution cycles to the inactive session, the network interface 152 may cease to maintain network resources (e.g., ports, tunnels, etc.) associated with the inactive session, etc. In another embodiment, the session manager 164 may continue to maintain the session at the system resource consumption level as if the session was active. It is understood that the above are merely a few illustrative examples to which the disclosed subject matter is not limited.

In various embodiments, this session-inactivation message may include a revised lifetime period value 176. In such an embodiment, the session manager 160 may replace the default or first lifetime period 166 with the revised lifetime period 176 indicated in the session-inactivation message. In such an embodiment, the set of session data 164, session ID 121, and other values associated with the session may be maintained while the lifetime period 166 (or counter 165 based upon the lifetime period 166) has not expired.

In one embodiment, if the lifetime period 166 (or counter 165 based upon the lifetime period 166) expires without further activity by the client application 120 (e.g., the user 190 spends a long period of time in the second application 122, etc.), the session may be terminated, as described above. However, if the client application 120 becomes active (e.g., sends a session-reactivation message, performs a session transaction, etc.) prior to the expiration of the lifetime period 166, the session may be resumed substantially as if the session was never made inactive. For example, the set of session data 164, the session ID 121 and other values associated with the session may be maintained and available to the client application 120. In one embodiment, the lifetime period 166 may be reset to a default or active value or the value that existed prior to the receipt of the revised lifetime period value 176.

In various embodiments, the revised lifetime period value 176 may be less than the default or previous lifetime period value. For example, the revised lifetime period value may be 10 minutes, whereas the default lifetime period value may be 30 minutes. It is understood that the above is merely one illustrative example to which the disclosed subject matter is not limited. In such an embodiment, the session-inactivation message may allow the session to be maintained for short periods of time, but for system resources to be freed for other sessions more quickly than if the client application 120 had simply stopped interacting with the server 104. In a less preferred embodiment, the revised lifetime period value 176 may be greater than the default lifetime period value.

In another embodiment, the client application 120 may re-activate the session, as described above. In some embodiments, this may include transmitting a session-reactivation message to the server 104. In various embodiments, this session-reactivation message may include the session ID 121 which may be employed to identify or, in some embodiments, authenticate the client application 120 and re-activate the session.

In various embodiments, this session ID 121 may be relatively secret in that only the server 104 and the client application 120 are expected to know the session ID 121. In such an embodiment, the session ID 121 may utilize a public/private key system or otherwise be cryptographically protected. In another embodiment, the session ID 121 may be unencrypted (although the transmissions between the client 120 and server 104 may be encrypted, for example via Hypertext Transfer Protocol Secure (HTTPS)). In yet another embodiment, the session ID 121 may not be transferred between devices (e.g., if a user 190 switches from a laptop to a desktop computing device, etc.), and may therefore identify only the client application 120 which originally created or established the session. It is understood that the above are merely a few illustrative examples to which the disclosed subject matter is not limited.

Figure 2A:
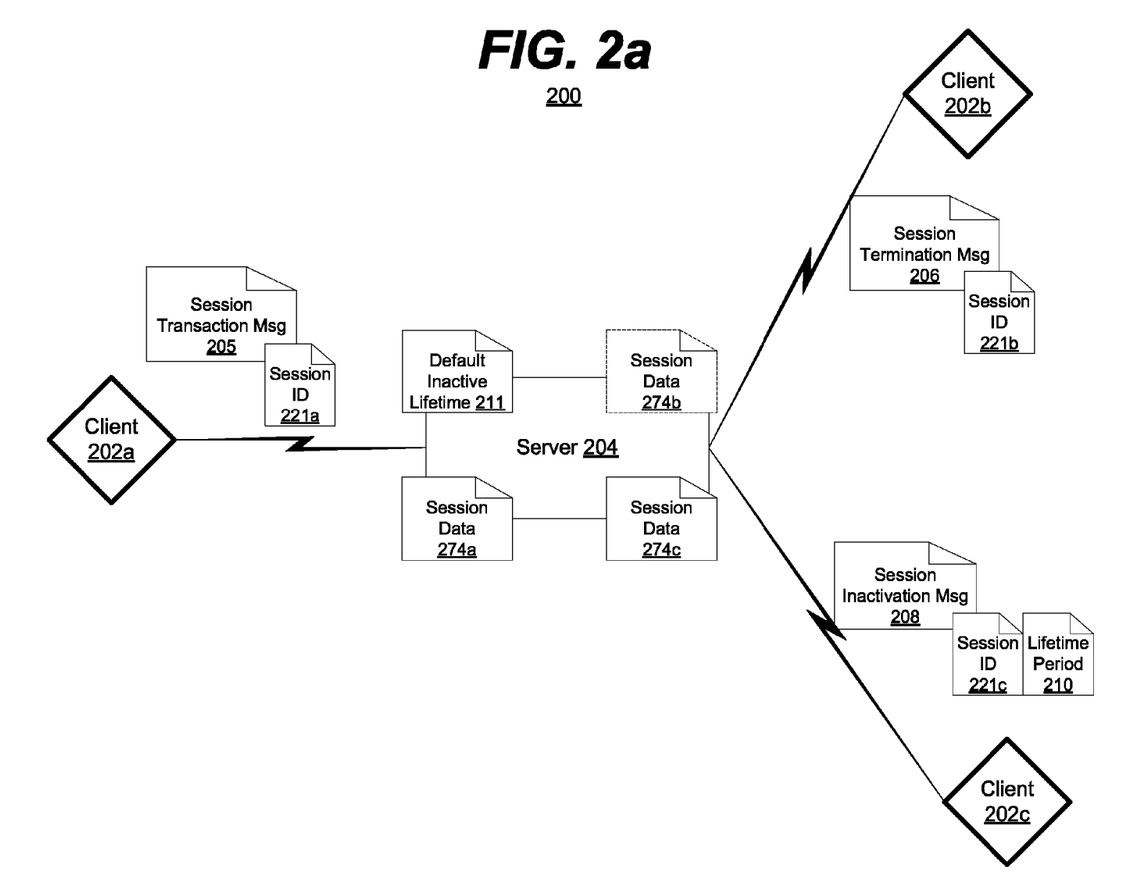
FIG. 2a is a block diagram of an example embodiment of a system in accordance with the disclosed subject matter.
Figure 2B:
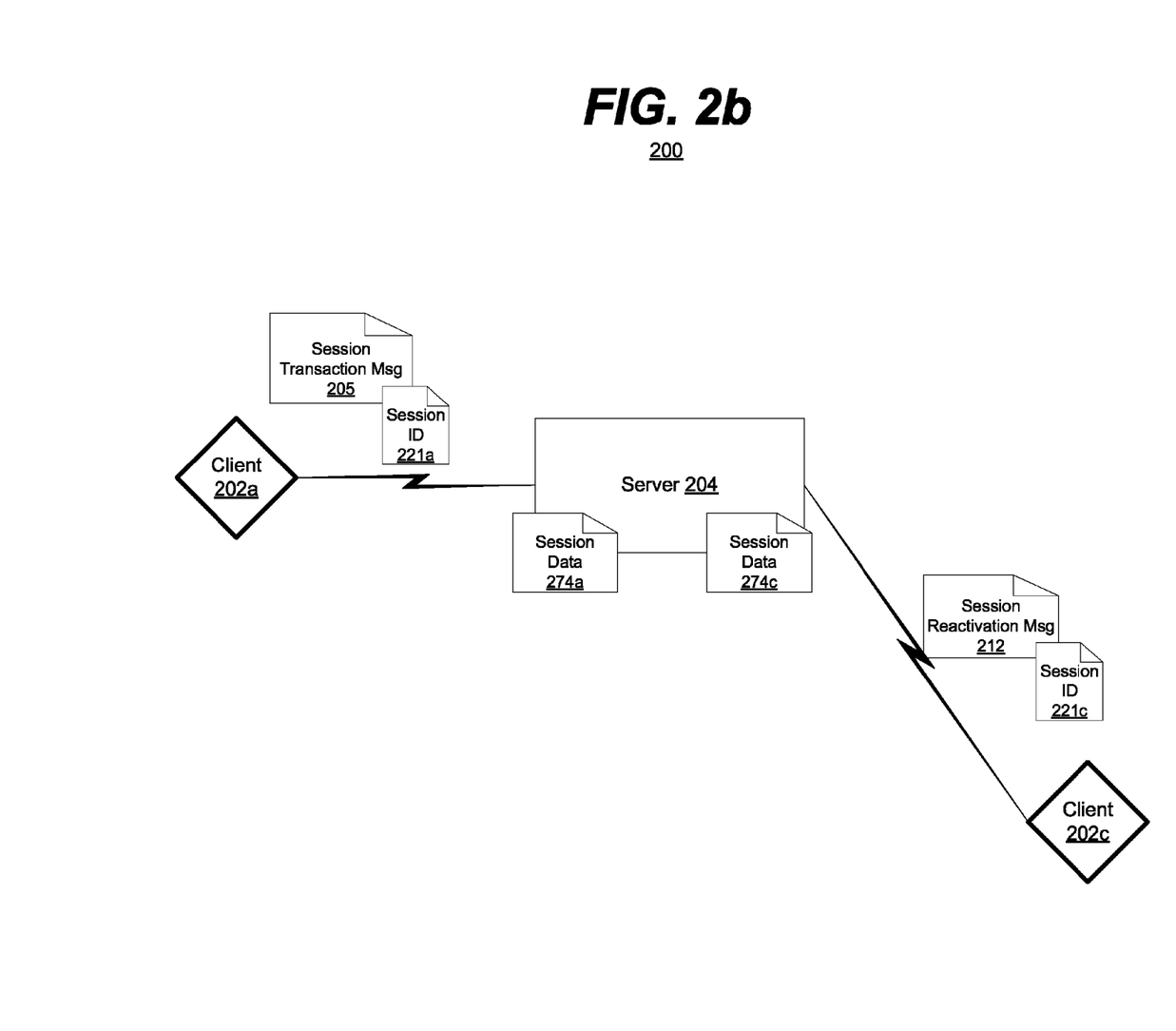
FIG. 2b is a block diagram of an example embodiment of a system in accordance with the disclosed subject matter.
Figure 2C:
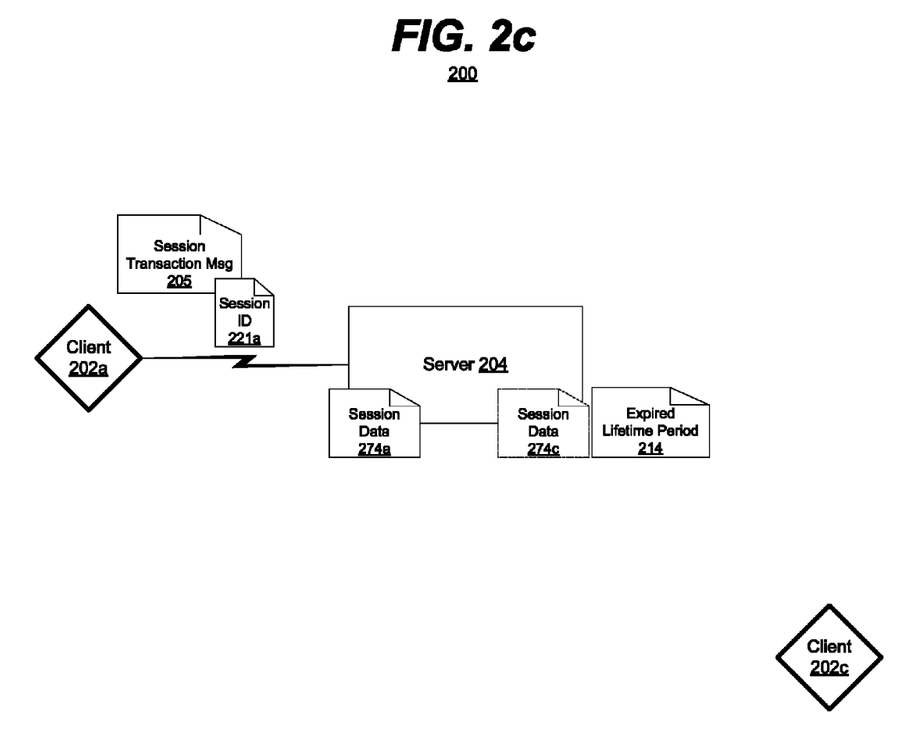
FIG. 2c is a block diagram of an example embodiment of a system in accordance with the disclosed subject matter.

FIG. 2a is a block diagram of an example embodiment of a system 200 in accordance with the disclosed subject matter. The system 200 may include three client devices or applications 202a, 202b, and 202c, and a server 204. FIGS. 2a, 2b, and 2c illustrate different examples of transactions or events that may occur in a system 200 which employs the disclosed subject matter.

In the illustrated embodiment, the clients 202a, 202b, and 202c may have all established respective data sessions with the server 204. As such, each client 202a, 202b, and 202c may be associated with respective session IDs 221a, 221b, and 221c, and respective sets of session data 274a, 274b, and 274c.

In one embodiment, the client 202a may communicate with the server via a session-transaction message 205. This session-transaction message 205 may include server data from or to the server 204, an instruction to perform an action (e.g., create, modify, or delete session data, move to a new user interface page or screen, authenticate the user/client, etc.). Such a session-transaction message 205 may be considered part of the normal workflow of a client using an established session. Each session-transaction message 205 to the server may include the client 202a's session ID 221a which identifies the client 202a and indicates that the server 204 should perform the instructed action in regards to the client 202a and not to clients 202b or 202c, for example.

In another embodiment, the client 202b may transmit a session-termination message 206 to the server 204. Again, the session-termination message 206 may include session ID 221b to identify the client 221b to the server 204. As described above, the receipt of the session-termination message 206 may cause the server 204 to cease maintaining the client 202b's session information, such as, for example, the set of session data 274b, the session ID 221b, etc. In such an embodiment, the server 204 may delete or otherwise cease to maintain the set of session data 274b, as described above.

In yet another embodiment, the client 202c may transmit a session-inactivation message 208 to the server 204. Again, the session-inactivation message 208 may include session ID 221c to identify the client 221c to the server 204. In one embodiment, the session-inactivation message 208 may include a revised lifetime period value 210, as described above. In another embodiment, the session-inactivation message 208 may not include a revised lifetime period value 210. In such an embodiment, the server 204 may employ a default inactive lifetime period value 211 as the revised lifetime period value 210. As described above, the server 204 may maintain the set of session data 274c during the period of inactivity, up to the revised (or default 211) lifetime period value 210.

FIG. 2b is a block diagram of an example embodiment of a system 200 in accordance with the disclosed subject matter. The system 200 may include two client devices or applications 202a, and 202c (client 202b having terminated its session), and a server 204. As described above, FIGS. 2a, 2b, and 2c illustrate different examples of transactions or events that may occur in a system 200 which employs the disclosed subject matter.

In one embodiment, the client 202c may wish to re-active the inactive session from FIG. 2a. In such an embodiment, the client 202c may transmit a session-reactivation message 212 to the server 204. Again, the session-reactivation message 212 may include session ID 221c to identify the client 202c to the server 204. In one embodiment, the session-reactivation message 212 may cause the server 204 to reactive the session associated with client 202c. In such an embodiment, the lifetime period may be reset to the default or prior (to inactivation) lifetime period, as described above. In such an embodiment, the client 202c may be able to resume the session without need for authentication (e.g., user entry of a password, etc.) or the recreation of the session data 274c. In such an embodiment, the client 202c may be able to resume the session with the same user interface screen or page which was last used before the session-inactivation message 208. The client 202c may be capable of resuming the session substantially seamlessly as if the client 202c or the client application (e.g., client application 120 of FIG. 1) had never been exited, placed in the background, or otherwise removed from active functioning.

FIG. 2c is a block diagram of an example embodiment of a system 200 in accordance with the disclosed subject matter. The system 200 may include two client devices or applications 202a, and 202c (client 202b having terminated its session), and a server 204. As described above, FIGS. 2a, 2b, and 2c illustrate different examples of transactions or events that may occur in a system 200 which employs the disclosed subject matter.

In one embodiment, the client 202c may have placed its respective session in an inactive state (e.g., via session-inactivation message 208 as shown in FIG. 2a). In the illustrated embodiment, the client 202c may not return to or interact with the session or server 204 before the lifetime period 214 expires. In such an embodiment, the server 204 may cease to maintain the set of session data 274c once the lifetime period 214 expires, as described above. In such an embodiment, once the session has been terminated either explicitly (e.g., via a session-termination message) or implicitly (e.g., via the expiration of the lifetime period), if the client 202c wishes to re-connect with the server 204, it may be required to start a new session and be assigned a new session ID (e.g., not session ID 221c) and be associated with a new set of server data (e.g., not set of session data 274c), as described above.

Figure 3A:
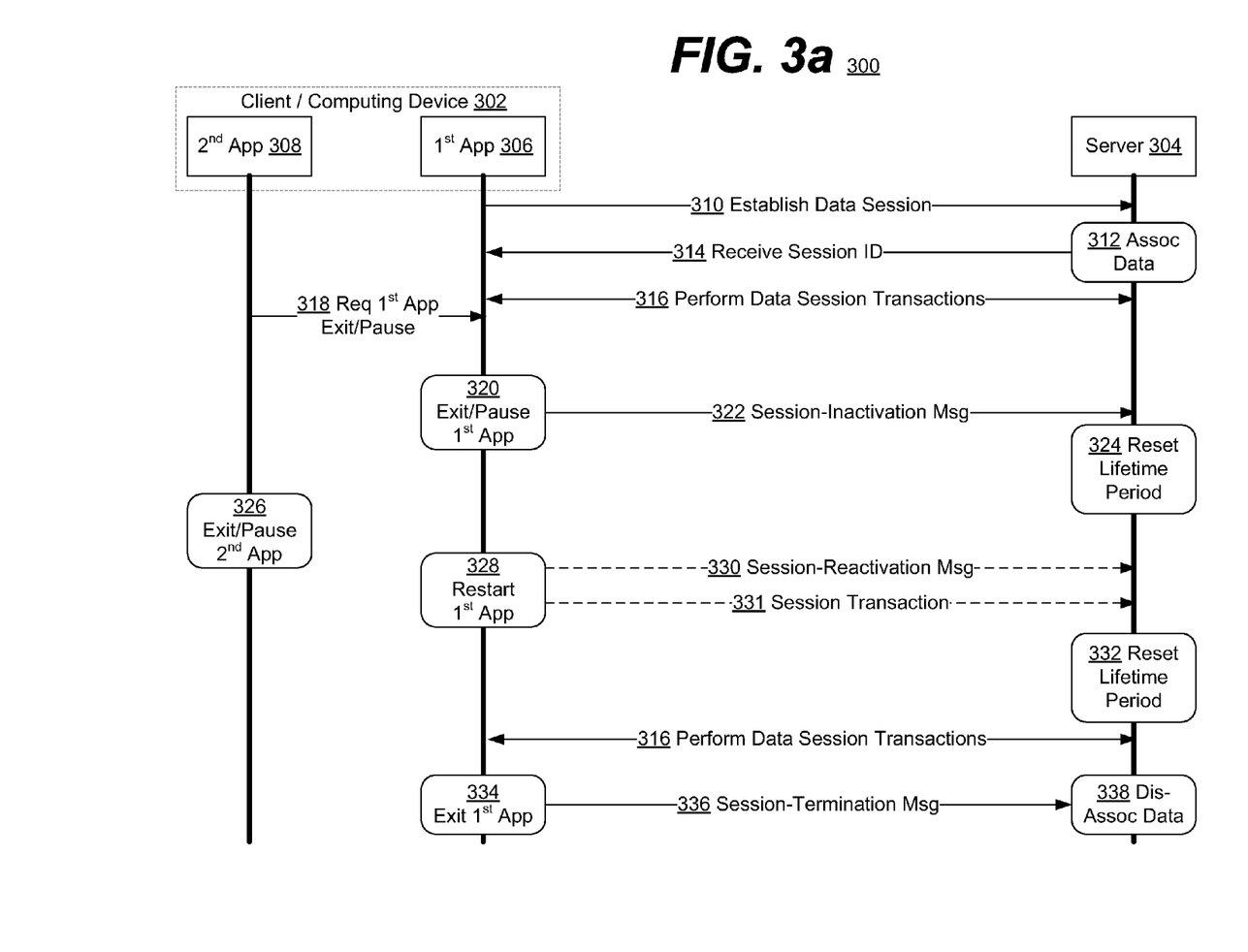
FIG. 3a is a timing diagram of an example embodiment of a system in accordance with the disclosed subject matter.

FIG. 3a is a timing diagram of an example embodiment of a system 300 in accordance with the disclosed subject matter. In one embodiment, the system 300 may include a server 304 and a client or computing device 302. In some embodiments, the computing device 302 may include or execute a first application 306 and a second application 308. FIG. 3a illustrates an embodiment in which the first application 306 places a session in an inactive mode, and then later reactivates the session.

In one embodiment, the first application 306 may establish a data session with server 304, as illustrated by arrow 310. As a result, the server 304 may create a set of session data and associate with the session established by first application 306, as illustrated by block 312. Further, the server 304 may assign and transmit the session ID to the first application 306, as illustrated by arrow 314. Once the data session has been established, the first application 306 and server 304 may perform one or more data session transactions, as illustrated by arrow 316.

In one embodiment, the second application 308 may request that the first application exit, pause, or otherwise terminate its active functioning, as illustrated by communication 318. Block 320 illustrates that the first application 306 may be exited, paused, switched to the background, or otherwise made inactive. Arrow 322 illustrates that the first application may transmit a session-inactivation message to the server 304, as described above. In various embodiments, the session-inactivation message may include the first application 306's session ID and, in some embodiments, a revised lifetime period value. Block 324 illustrates that the server 304 may reset the lifetime period associated with the first application 306 to the revised lifetime period value, or, in another embodiment, a default inactive lifetime period value, as described above.

Block 326 illustrates that at some time the second application 308 may exit or be placed into the background. In one embodiment, this may cause the first application 306 to be restarted or returned to the foreground, as illustrated by Block 328.

As illustrated by arrow 330, in one embodiment, the first application 306 may transmit a session-reactivation message to the server 304, as described above. As described above, this session-reactivation message may include the session ID assigned to the first application 306 and associated with the session in arrow 310.

As illustrated by arrow 331, in an alternate embodiment, the first application 306 may resume the inactive session by transmitting a session transaction message to the server 304. As described above, this session-transaction message may include the session ID assigned to the first application 306 and associated with the session in arrow 310.

In the illustrated embodiment, the lifetime period may not have expired by the time the server 304 receives either the server-reactivation message or the session-transaction message, depending upon the embodiment. Therefore, the session and its associated session data and session ID may still be maintained and valid.

In one embodiment, the server 304 may reset the lifetime period, as illustrated by Block 332. As described above, he lifetime period may be reset to the default value or the value it had prior to the session-inactivation message of arrow 322. Arrow 316 illustrates that the data session transactions may be resumed as if the session had not been inactive for a period of time, as described above.

Block 334 illustrates that the first application 306 may exit at some point in time. Arrow 336 illustrates that, in one embodiment, he first application 306 may transmit a session-termination message to the server 304 as part of the exiting of the first application 306. As described above, the server 304 may delete or dis-associate any session data and the session ID once the session has been terminated, as illustrated by block 338.

In the illustrated embodiment, the first application 306 was exited or removed from an active state twice, in Blocks 320 and 334. In such an embodiment, the first application 306 may be configured to determine whether or not the exiting of the application 306 should result in a session-inactivation message or a session-termination message.

In one embodiment, the session-inactivation message may be used when the application 306 is being switched to the background. In another embodiment, the session-inactivation message may be used when the application 306 is terminated due to one a select number of second applications 308 (e.g., a phone application, an instant messaging application, an email application, etc.). In various embodiments, these select second application 308 may be predefined or may be defined by a tag, category (e.g., communication, business, research, etc.), or an indicator in metadata associated with the second application 308. In yet another embodiment, the user may indicate whether or not they wish to transmit a session-inactivation message or a session-termination message. For example, the user may be explicitly asked or the user may be able to define a set of rules (e.g., if the second application is a phone application, if the computing device is at a certain location, such as, work, if it is a certain time of day, etc.) that dictate whether or not the first application 306 will transmit the session-inactivation message or the session-termination message. In yet another embodiment, the first application 306 may make a determination as to whether or not the session is likely to be reactivated within a certain lifetime period (e.g., the revised lifetime period). In such an embodiment, a threshold level of probability may be employed to determine the likelihood of the event. It is understood that the above are merely a few illustrative examples to which the disclosed subject matter is not limited.

Figure 3B:
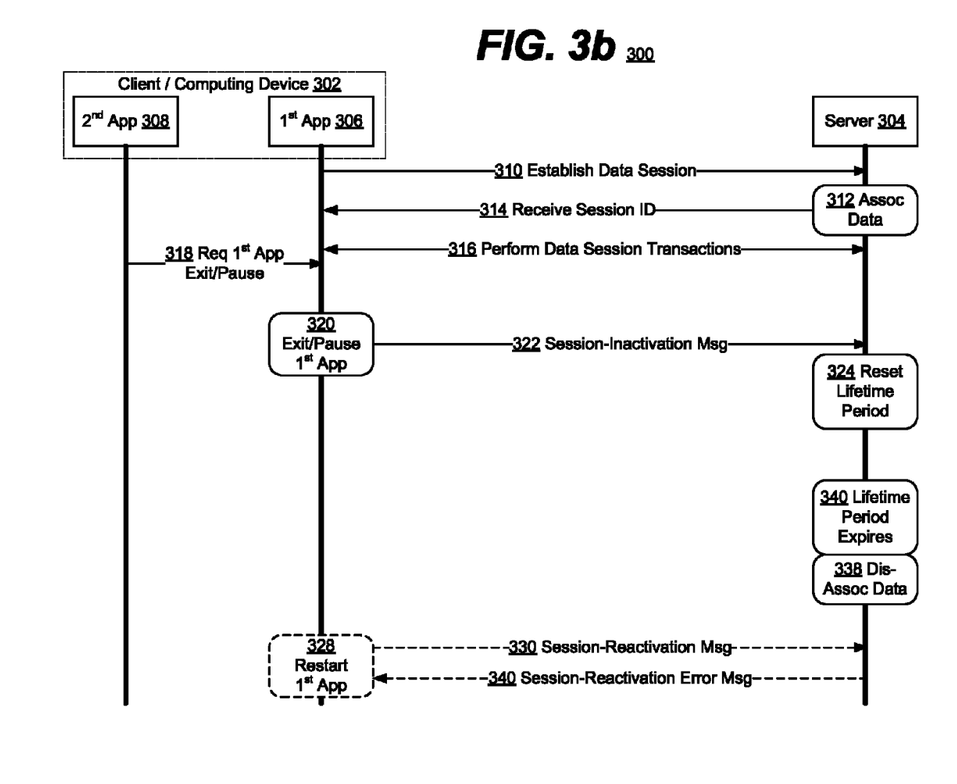
FIG. 3b is a timing diagram of an example embodiment of a system in accordance with the disclosed subject matter.

FIG. 3*b* is a timing diagram of an example embodiment of a system 300 in accordance with the disclosed subject matter. In one embodiment, the system 300 may include a server 304 and a client or computing device 302. In some embodiments, the computing device 302 may include or execute a first application 306 and a second application 308. FIG. 3*b* illustrates an embodiment in which the first application 306 places a session in an inactive mode, but fails to reactivate the session.

FIG. 3*b* illustrates a time process or series of actions identical to that illustrated by FIG. 3*a* up until the server 304 resets the lifetime period to the revised lifetime period (Block 324). At this point, the first application 306 has notified the server 304 that the session is going inactive and the server 304 should maintain the session data, etc. for a period of time equal to the revised lifetime period.

In the illustrated embodiment, the first application 306 does not revoke the session inactivation before the lifetime period expires, as illustrated by Block 340. As described above, once the lifetime period expires the server 304 may terminate the session and cease maintaining the set of session data. Block 338 illustrates that the server 304 may disassociate any session data and session ID from the first application 306, as described above.

Block 328 illustrates that, in some embodiments, the first application 306 may be restarted, brought back to the foreground, or otherwise placed in an active state. Arrow 330 illustrates that the first application 306 may attempt reactive the session via a session-reactivation message. However, as the lifetime period has expired (Block 340) the server 304 has deleted or dis-associated the session data and session ID from the first application (Block 338). Arrow 340 illustrates that, in some embodiments, the server 304 may transmit an error message to the first application 306 indicating that the session ID provided in the tardy session-reactivation message is no longer valid. In some embodiments, this error message may include an invitation to establish a second session.

In some embodiments, the first application 306 may be configured to track the lifetime period. In such an embodiment, the first application 306 may be aware that the lifetime period has expired (Block 340), and instead of transmitting an erroneous session-reactivation message, the first application 306 may establish a new session (similarly to arrow 310).

Figure 4:
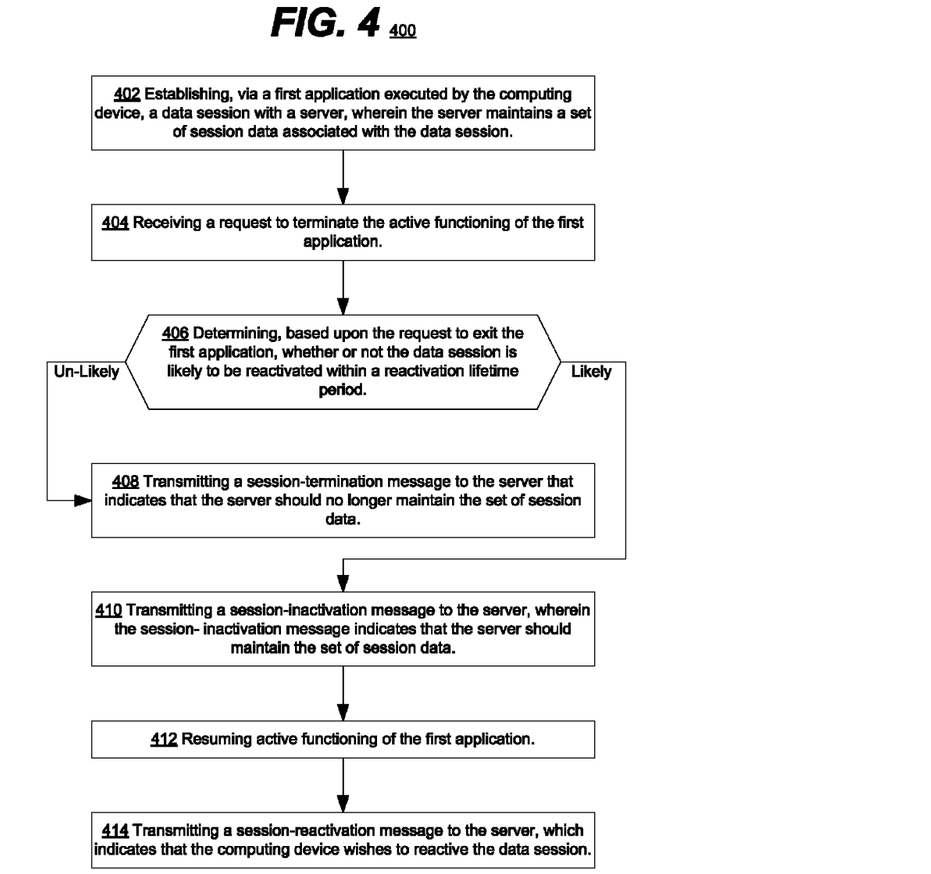
FIG. 4 is a flow chart of an example embodiment of a technique in accordance with the disclosed subject matter.

FIG. 4 is a flow chart of an example embodiment of a technique 400 in accordance with the disclosed subject matter. In various embodiments, the technique 400 may be used or produced by the systems such as those of FIGS. 1, 2*a*, 2*b*, 2*c*, 3*a*, or 3*b*. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a first application executed by the computing device may establish a data session with a server, as described above. In some embodiments, the server may maintain a set of session data associated with the session, the first application or the computing device, as described above. In some embodiments, establishing may include establishing a data session that includes a session with a first lifetime period after which the set of session data is dis-associated with the data session, as described above.

In another embodiment, establishing may include receiving a data session identifier that identifies the computing device to the server, as described above. In yet another embodiment, establishing may include causing the data session and the associated set of session data to be maintained only until the expiration of a first lifetime period, wherein the start of the first lifetime period occurs based upon the accessing of the set of data by the computing device, as described above. In various embodiments, one or more of the action(s) illustrated by this Block may be performed by the apparatuses or systems of FIGS. 1, 2a, 2b, 2c, 3a, or 3b, the computing device 102 or first application 120 of FIG. 1, the clients 202a, 202b, or 202c, of FIGS. 2a, 2b, or 2c, or the computing device 302 or first application 306 of FIG. 3a, or 3b, as described above.

Block 404 illustrates that, in one embodiment, a request to terminate the active functioning of the first application may be received, as described above. In some embodiments, terminating the active functioning may include exiting the first application or switching the first application to the background, as described above. In some embodiments, receiving the request may include receiving a request to execute a second application on the computing device, as described above. In various embodiments, this second application may include a telephone application, as described above. In various embodiments, one or more of the action(s) illustrated by this Block may be performed by the apparatuses or systems of FIGS. 1, 2a, 2b, 2c, 3a, or 3b, the computing device 102, first application 120 or second application 122 of FIG. 1, the clients 202a, 202b, or 202c, of FIGS. 2a, 2b, or 2c, or the computing device 302, first application 306 or second application 308 of FIG. 3a, or 3b, as described above.

Block 406 illustrates that, in one embodiment, the computing device may determine, based upon the request to exit the first application, whether or not the data session is likely to be reactivated within a reactivation lifetime period, as described above. In various embodiments, one or more of the action(s) illustrated by this Block may be performed by the apparatuses or systems of FIGS. 1, 2a, 2b, 2c, 3a, or 3b, the computing device 102 or first application 120 of FIG. 1, the clients 202a, 202b, or 202c, of FIGS. 2a, 2b, or 2c, or the computing device 302 or first application 306 of FIG. 3a, or 3b, as described above.

Block 408 illustrates that, in one embodiment, if it is determined that the data session is not likely to be reactivated within a reactivation lifetime period, a session-termination message may be transmitted to the server, as described above. In various embodiments, the session-termination message may indicate that the server should no longer maintain the set of session data, as described above. In various embodiments, one or more of the action(s) illustrated by this Block may be performed by the apparatuses or systems of FIGS. 1, 2a, 2b, 2c, 3a, or 3b, the computing device 102 or first application 120 of FIG. 1, the clients 202a, 202b, or 202c, of FIGS. 2a, 2b, or 2c, or the computing device 302 or first application 306 of FIG. 3a, or 3b, as described above.

Block 410 illustrates that, in one embodiment, a session-inactivation message may be transmitted to the server, as described above. In various embodiments, the session-inactivation message may indicate that the server should continue maintain the set of session data, as described above. In various embodiments, transmitting may include transmitting a session-inactivation message that includes a revised lifetime period value, which is less than a default lifetime period and after which the set of session data is deleted, as described above. In one embodiment, transmitting may include transmitting a session-inactivation message that includes the data session identifier and a request for the server to maintain the set of session data associated with the data session for a second lifetime period, which is less than the first lifetime period, as described above. In various embodiments, one or more of the action(s) illustrated by this Block may be performed by the apparatuses or systems of FIGS. 1, 2a, 2b, 2c, 3a, or 3b, the computing device 102 or first application 120 of FIG. 1, the clients 202a, 202b, or 202c, of FIGS. 2a, 2b, or 2c, or the computing device 302 or first application 306 of FIG. 3a, or 3b, as described above.

Block 412 illustrates that, in one embodiment, active functioning of the first application may be resumed, as described above. In various embodiments, one or more of the action(s) illustrated by this Block may be performed by the apparatuses or systems of FIGS. 1, 2a, 2b, 2c, 3a, or 3b, the computing device 102 or first application 120 of FIG. 1, the clients 202a, 202b, or 202c, of FIGS. 2a, 2b, or 2c, or the computing device 302 or first application 306 of FIG. 3a, or 3b, as described above.

Block 414 illustrates that, in one embodiment, a session-reactivation message may be transmitted to the server, as described above. In various embodiments, the session-reactivation message may indicate that the computing device wishes to reactive the data session, as described above. In various embodiments, one or more of the action(s) illustrated by this Block may be performed by the apparatuses or systems of FIGS. 1, 2a, 2b, 2c, 3a, or 3b, the computing device 102 or first application 120 of FIG. 1, the clients 202a, 202b, or 202c, of FIGS. 2a, 2b, or 2c, or the computing device 302 or first application 306 of FIG. 3a, or 3b, as described above.

Figure 5:
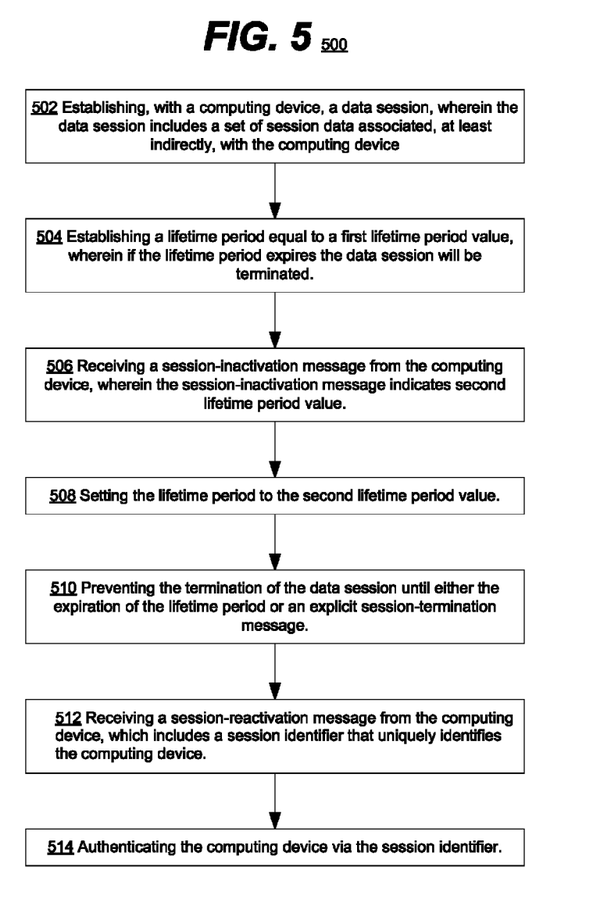
FIG. 5 is a flow chart of an example embodiment of a technique in accordance with the disclosed subject matter.

FIG. 5 is a flow chart of an example embodiment of a technique 500 in accordance with the disclosed subject matter. In various embodiments, the technique 500 may be used or produced by the systems such as those of FIGS. 1, 2a, 2b, 2c, 3a, or 3b. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a data session may be established with a computing device, as described above. In various embodiments, the data session may include a set of session data associated, at least indirectly, with the computing device, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Block 504 illustrates that, in one embodiment, a lifetime period equal to a first lifetime period value may be established, as described above. In various embodiments, if the lifetime period expires the data session will be terminated, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Block 506 illustrates that, in one embodiment, a session-inactivation message may be received from the computing device, as described above. In various embodiments, the session-inactivation message may indicate or include a second lifetime period value, as described above. In some embodiments, the second lifetime period value may be less than the first lifetime period value, as described above. In another embodiment, the session-inactivation message may indicate that the lifetime period be set to a predefined second lifetime value, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Block 508 illustrates that, in one embodiment, the lifetime period may be set to the second lifetime period value, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Block 510 illustrates that, in one embodiment, the termination of the data session may be prevented until either the expiration of the lifetime period or an explicit session-termination message, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Block 512 illustrates that, in one embodiment, a session-reactivation message may be received from the computing device, as described above. In some embodiments, the session-reactivation message may include an indication that the computing device wishes to reactive the data session, as described above. In various embodiments, the session-reactivation message may include a session identifier that substantially uniquely identifies the computing device, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Block 514 illustrates that, in one embodiment, the computing device may the authenticated via the session identifier or the session-reactivation message, as described above. In various embodiments, one or more of the action(s) illustrated by this Block may be performed by the apparatuses or systems of FIGS. 1, 2a, 2b, 2c, 3a, or 3b, the server 104 or session manager 160 of FIG. 1, the server 204 of FIGS. 2a, 2b, or 2c, or the server 304 of FIG. 3a, or 3b, as described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for a computing device, the method comprising:
    establishing, via a first application executed by the computing device, a data session with a server, wherein the server maintains a set of session data associated with the data session;
    processing a request to terminate active functioning of the first application; and
    transmitting a session-inactivation message to the server, wherein the session-inactivation message instructs the server to replace a first lifetime period for the set of session data with a second lifetime period for the set of session data.

2. The method of claim 1, wherein processing a request to terminate the first application includes:
    processing a request to execute a second application on the computing device.

3. The method of claim 2, wherein the second application includes a telephone application.

4. The method of claim 1, wherein establishing the data session includes:
   establishing a data session that includes the first lifetime period after which the set of session data is dis-associated with the data session; and
   wherein transmitting a session-inactivation message includes:
      replacing the first lifetime period with the second lifetime period, the second lifetime period being less than the first lifetime period and after which the set of session data is dis-associated with the data session.

5. The method of claim 1, wherein transmitting the session-inactivation message includes:
   transmitting a session-inactivation message that includes the second lifetime period value, which is less than the first lifetime period and after which the set of session data is deleted.

6. The method of claim 1, further including:
   resuming the active functioning of the first application; and
   transmitting a session-reactivation message to the server, wherein the session-reactivation message instructs the server to reactivate the data session.

7. The method of claim 1, wherein establishing the data session includes:
   receiving a data session identifier that identifies the computing device to the server, and
   causing the data session and the associated set of session data to be maintained only until expiration of the first lifetime period, wherein a start of the first lifetime period occurs based upon accessing of the set of session data by the computing device; and
   wherein transmitting a session-inactivation message to the server includes:
      transmitting a session-inactivation message that includes the data session identifier and a request for the server to maintain the set of session data associated with the data session for the second lifetime period, which is less than the first lifetime period.

8. The method of claim 1, further comprising:
   determining, based upon the request to terminate the first application, whether or not the data session is likely to be reactivated within a reactivation lifetime period, and
   if it is determined that the data session is not likely to be reactivated within a reactivation lifetime period, transmitting a session-termination message to the server that instructs the server to delete the set of session data; and
   wherein transmitting the session-inactivation message to the server includes:
      transmitting the session-inactivation message to the server, if it is determined that the data session is likely to be reactivated within the reactivation lifetime period.

9. A method comprising:
   establishing, with a computing device, a data session, wherein the data session includes a set of session data associated, at least indirectly, with the computing device;
   establishing a lifetime period equal to a first lifetime period value, wherein if the lifetime period expires the data session is terminated;
   receiving a session-inactivation message from the computing device, wherein the session-inactivation message indicates a second lifetime period value;
   setting the lifetime period to the second lifetime period value; and
   preventing the termination of the data session until either the expiration of the lifetime period or receipt of a session-termination message.

10. The method of claim 9, wherein the second lifetime period value is less than the first lifetime period value.

11. The method of claim 9, wherein the session-inactivation message indicates that the lifetime period be set to a predefined second lifetime value.

12. The method of claim 9, further comprising:
   receiving a session-reactivation message from the computing device, the session-reactivation message including:
      an instruction from the computing device to reactivate the data session, and
      a session identifier that substantially identifies the computing device; and
   authenticating the computing device via the session identifier.

13. An apparatus comprising:
   a network interface configured to send and receive signals between a sever server and the apparatus;
   a memory configured to store executable code;
   a processor configured to execute the executable code; and
   wherein the executable code is configured to cause the apparatus to:
      establish, via a first application executed by the apparatus, a data session with the server, wherein the server maintains a set of session data associated with the data session,
      process a request to terminate active functioning of the first application, and
      transmit a session-inactivation message to the server, wherein the session-inactivation message instructs the server to replace a first lifetime period for the set of session data with a second lifetime period for the set of session data.

14. The apparatus of claim 13, wherein the executable code causes the apparatus to:
   process a request to execute a second application via the apparatus.

15. The apparatus of claim 14, wherein the second application includes a telephone application.

16. The apparatus of claim 13, wherein the executable code causes the apparatus to:
   establish a data session that includes the first lifetime period after which the set of session data is dis-associated with the data session; and
   replace the first lifetime period with the second lifetime period, the second lifetime period being less than the first lifetime period and after which the set of session data is dis-associated with the data session.

17. The apparatus of claim 13, wherein the executable code causes the apparatus to:
   transmit a session-inactivation message that includes a second lifetime period value, which is less than the first lifetime period and after which the set of session data is deleted.

18. The apparatus of claim 13, wherein the executable code causes the apparatus to:
   resume active functioning of the first application; and
   transmit a session-reactivation message to the server, wherein the session-reactivation message instructs the server to reactivate the data session.

19. The apparatus of claim 13, wherein the executable code causes the apparatus to:
   establish a data session by:
      receiving a data session identifier that identifies the first application to the server, and causing the data session and the associated set of session data to be maintained only until expiration of the first lifetime period, wherein a start of the first lifetime period occurs based upon accessing of the set of session data by the apparatus; and transmit a session-inactivation message to the server by:
transmitting a session-inactivation message that includes the data session identifier and a request for the server to maintain the set of session data associated with the data session for the second lifetime period, the second lifetime period being less than the first lifetime period.

20. The apparatus of claim 13, wherein the executable code causes the apparatus to:
determine, based upon the request to terminate the first application, whether or not the data session is likely to be reactivated within a reactivation lifetime period; and
if it is determined that the data session is not likely to be reactivated within the reactivation lifetime period, transmit a session-termination message to the server that instructs the server to delete the set of session data; or
if it is determined that the data session is likely to be reactivated within the reactivation lifetime period, transmit the session-inactivation message to the server.

21. A non-transitory computer-readable storage medium comprising instructions stored thereon that, when executed by at least one processor, are configured to cause a server to:
establish, with a computing device, a data session, wherein the data session includes a set of session data associated, at least indirectly, with the computing device;
establish a lifetime period equal to a first lifetime period value, wherein if the lifetime period expires the data session is terminated;
receive a session-inactivation message from the computing device;
in response to receiving the session-inactivation message from the computing device, set the lifetime period to a second lifetime period value; and
prevent the termination of the data session until either the expiration of the lifetime period or receipt of a session-termination message.

22. A non-transitory computer-readable storage medium comprising instructions stored thereon that, when executed by at least one processor, are configured to cause a computing device to:
establish, via a first application executed by the computing device, a data session with a server, wherein the server maintains a set of session data associated with the data session;
process a request to terminate active functioning of the first application;
determine, based upon the request to terminate the first application, whether or not the data session is likely to be reactivated within a reactivation lifetime period; and
if it is determined that the data session is not likely to be reactivated within the reactivation lifetime period, transmit a session-termination message to the server that instructs the server to delete the set of session data; or
if it is determined that the data session is likely to be reactivated within the reactivation lifetime period, transmit a session-inactivation message to the server.

* * * * *